US007906937B2

(12) United States Patent
Bhade et al.

(10) Patent No.: US 7,906,937 B2
(45) Date of Patent: Mar. 15, 2011

(54) OVERCURRENT AND GROUND FAULT PROTECTION IN A NETWORKED CHARGING STATION FOR ELECTRIC VEHICLES

(75) Inventors: Harjinder Bhade, San Jose, CA (US); Milton Tormey, Los Altos, CA (US); David Baxter, Monte Sereno, CA (US); Richard Lowenthal, Cupertino, CA (US); Praveen Mandal, Los Altos Hills, CA (US)

(73) Assignee: Coulomb Technologies, Inc., Campbell, CA (US)

( * ) Notice: Subject to any disclaimer, the term of this patent is extended or adjusted under 35 U.S.C. 154(b) by 108 days.

(21) Appl. No.: 12/477,089

(22) Filed: Jun. 2, 2009

(65) Prior Publication Data

US 2010/0301809 A1 Dec. 2, 2010

(51) Int. Cl.
*H02J 7/00* (2006.01)
(52) U.S. Cl. ......... 320/109; 320/104; 320/134; 320/136
(58) Field of Classification Search .................... 320/109
See application file for complete search history.

(56) References Cited

U.S. PATENT DOCUMENTS

| 4,272,687 | A | | 6/1981 | Borkan |
| 4,979,070 | A | | 12/1990 | Bodkin |
| 5,297,664 | A | * | 3/1994 | Tseng et al. .................. 194/217 |
| 5,315,499 | A | | 5/1994 | Bilas et al. |
| 5,982,596 | A | | 11/1999 | Spencer et al. |
| 6,614,204 | B2 | | 9/2003 | Pellegrino et al. |
| 7,440,246 | B2 | | 10/2008 | Bonasia et al. |
| 7,683,570 | B2 | * | 3/2010 | Krauer et al. ................. 320/104 |
| 2005/0099131 | A1 | | 5/2005 | Amarillas et al. |
| 2009/0021213 | A1 | | 1/2009 | Johnson |

OTHER PUBLICATIONS

"Circuit Breaker Can Be Reset Remotely", ThomasNet Industrial News Room, ThomasNet.com, Archive News Story, Oct. 15, 2004, 2 pages.
"Electric Vehicle Charging Stations Now Operational in Fabulous Las Vegas", EV-Charge America, Press Release, PR.com, Apr. 12, 2009, 1 page.

* cited by examiner

*Primary Examiner* — Edward Tso
*Assistant Examiner* — Johali A Torres Ruiz
(74) *Attorney, Agent, or Firm* — Blakely, Sokoloff, Taylor & Zafman LLP

(57) ABSTRACT

A networked charging station for electric vehicles protects against overcurrent and ground fault conditions. Upon detecting an overcurrent condition or a ground fault condition, the networked charging station for electric vehicles de-energizes a charging point connection to prevent electric current from flowing between an electric vehicle and the networked charging station and suspends the charging session. The networked charging station clears the overcurrent condition or the ground fault condition upon receipt of an authorized request which is transmitted remotely. The authorized request can be received from the vehicle operator that is associated with the charging session or from an administrator of the charging station through a radio-frequency identifier (RFID) tag enabled device or through a text message or an email message. The networked charging station clears the overcurrent condition or the ground fault condition without a manual reset of a circuit breaker or a GFCI device respectively.

20 Claims, 7 Drawing Sheets

OVERCURRENT AND GROUND FAULT PROTECTION IN A NETWORKED CHARGING STATION FOR ELECTRIC VEHICLES

BACKGROUND

1. Field

Embodiments of the invention relate to the field of charging electric vehicles, and more specifically to overcurrent and ground fault protection in a networked charging station for electric vehicles.

2. Background

Charging stations are typically used to provide charging points for electric vehicles (e.g., electric battery powered vehicles, gasoline/electric battery powered vehicle hybrid, etc.). For example, charging stations may be located in designated charging locations (e.g., similar to locations of gas stations), parking spaces (e.g., public parking spaces and/or private parking space), etc.

One or more charging stations are typically wired to a circuit breaker in a panel that is accessible by maintenance personnel and is inaccessible to vehicle operators. Thus, when the circuit breaker trips, a maintenance call is typically placed which requires maintenance personnel to physically travel to the site of the panel of the tripped circuit breaker to manually reset the tripped circuit breaker.

Charging stations typically include a power receptacle to receive electrical plugs. The power receptacle can be protected by a ground fault circuit interrupter (GFCI) device. In typical charging stations, the GFCI switch must be manually reset after tripping.

SUMMARY

A method and apparatus for overcurrent and ground fault protection in a networked charging station for electric vehicles is described herein. A charging session is established between an electric vehicle and the networked charging station including energizing a charging point connection (e.g., a power receptacle or an attached charging cord) of the networked charging station to allow electricity to flow between the networked charging station and the electric vehicle. The networked charging station monitors the electric current between the networked charging station and the electric vehicle.

Responsive to detecting an overcurrent condition (e.g., electric current has exceeded an electric current threshold), the networked charging station suspends the charging station and de-energizes the charging point connection to prevent electricity from flowing between the networked charging station and the electric vehicle. The networked charging station can also cause a notification message (e.g., email, text message (e.g., text message), etc.) reflecting the overcurrent condition and suspension of the charging session to be transmitted to the vehicle operator associated with the charging session and/or to administrator(s) and/or owner(s) of the networked charging station. The networked charging station is configured to resume the charging session and re-energize the power receptacle upon receipt of an authorized remote overcurrent reset request thereby avoiding a manual reset of a circuit breaker coupled with the networked charging station. The remote overcurrent reset request can be received from the operator which initiated the charging session (e.g., the operator can present a smart card with an embedded RFID tag associated with the operator to the networked charging station, the operator can use a subscriber web portal to submit the request, the operator can transmit a text message or email message to submit the request, etc.) or the request can be received from an administrator or owner of the networked charging station (e.g., an administrator or owner of the networked charging station can present a smart card with an embedded RFID tag associated with a master or supervisor account, an administrator or owner can use a host web portal to submit the request, the owner or administrator can transmit a text message or email message to submit the request, etc.).

Responsive to detecting a ground fault condition, the networked charging station suspends the charging session and de-energizes the charging point connection to prevent electricity from flowing between the networked charging station and the electric vehicle. The networked charging station can also cause a notification message (e.g., email, text message, etc.) reflecting the ground fault circuit interrupt condition to be transmitted to the operator associated with the charging session and/or to administrator(s) and/or owner(s) of the networked charging station. The networked charging station is configured to resume the charging session and re-energize the power receptacle upon receipt of an authorized remote ground fault circuit interrupt reset request thereby avoiding a manual reset of a ground fault circuit interrupt device. The remote ground fault circuit interrupt request can be received from the operator which initiated the charging session (e.g., the operator can present a smart card with an embedded RFID tag associated with the operator to the networked charging station, the operator can use a subscriber web portal to submit the request, the operator can transmit a text message or email message to submit the request, etc.) or the request can be received from an administrator or owner of the networked charging station (e.g., an administrator or owner of the networked charging station can present a smart card with an embedded RFID tag associated with a master or supervisor account, an administrator or owner can use a host web portal to submit the request, the owner or administrator can transmit a text message or email message to submit the request, etc.).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
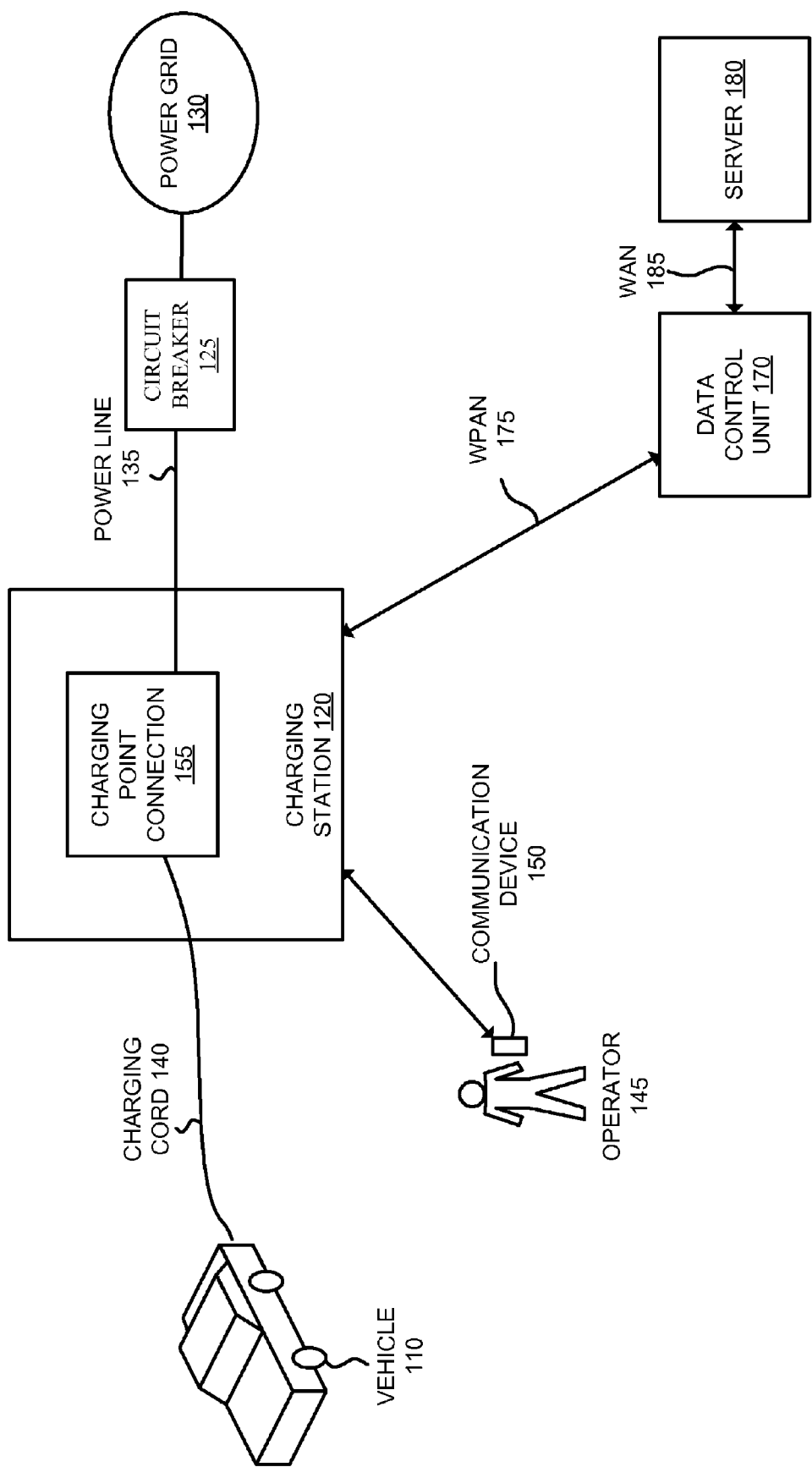
FIG. 1 illustrates an exemplary charging system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computing devices (e.g., charging stations, charging station network servers, etc.). As used herein, a charging station is a piece of equipment, including hardware and software, to charge electric vehicles. Such computing devices store and communicate (internally and with other computing devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

FIG. 1 illustrates an exemplary charging system according to one embodiment of the invention. The charging system illustrated in FIG. 1 includes the networked electric vehicle charging station 120 (hereinafter referred to as the "charging station" 120), which is coupled with the power grid 130 over the power line 135. The power grid 130 can be owned and/or operated by local utility companies or owned and/or operated by private persons/companies. The power line 135 is wired to the circuit breaker 125, which can be separate and remote from the charging station 120. In one embodiment, the circuit breaker 125 is inaccessible to vehicle operators (e.g., the vehicle operator 145).

The charging station 120 is also coupled with the data control unit 170 over the WPAN (Wireless Personal Area Network) line 175 (e.g., Bluetooth, ZigBee, etc.) or other LAN (Local Area Network) links (e.g., Ethernet, PLC, WiFi, etc.). The data control unit 170 is coupled with the electric vehicle charging station network server 180 (hereinafter "server" 180) over the WAN (Wide Access Network) connection 185 (e.g., Cellular (e.g., CDMA, GPRS, etc.) WiFi Internet connection, Plain Old Telephone Service, leased line, etc.). The data control unit 170 is a gateway to the server 180 and relays messages and data between the charging station 120 and the server 180. According to one embodiment of the invention, the data control unit 170 can be included as part of another charging station as will be described in more detail with reference to FIG. 2. Of course it should be understood that the data control unit 170 can be a separate device not included in a charging station or can be included in the charging station 120.

Operators of electric vehicles use the charging station 120 to charge their electric vehicles. For example, the electricity storage devices (e.g., batteries, supercapacitors, etc.) of electric vehicles (e.g., electric powered vehicles, gasoline/electric powered vehicle hybrids, etc.) may be charged through use of the charging station 120. It should be understood that electric vehicle operators may include drivers of electric vehicles, passengers of electric vehicles, and/or service personnel of electric vehicles. In one embodiment, the operators of electric vehicles provide their own charging cord to charge their electric vehicle (e.g., the charging cord 140 belongs to the electric vehicle operator 145), while in other embodiments the charging station 120 includes an attached charging cord (e.g., the charging cord 140 is fixably attached to the charging station 120).

In one embodiment, the charging station 120 can charge in a dual mode at different voltages (e.g., 120V and 240V). By way of example, a fixably attached charging cord is typically used in a higher voltage mode (e.g., 240V) and an unattached charging cord is typically inserted into a power receptacle of the charging station 120 in a lower voltage mode (e.g., 120V).

The charging station 120 controls the application of electricity from the power grid 130 to the charging point connection 155 (e.g., energizes and de-energizes the charging point connection 155). In one embodiment, the charging point connection 155 is a power receptacle or an attached charging cord (e.g., thus the charging station 120 can energize/de-energize the power receptacle or the attached charging cord). The power receptacle can be any number of types of receptacles such as receptacles conforming to the NEMA (National Electrical Manufacturers Association) standards 5-15, 5-20, and 14-50 or other standards (e.g., BS 1363, CEE7, etc.) and may be operating at different voltages (e.g., 120V, 240V, 230V, etc.).

The electric vehicle operator 145 may use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.)), ZigBee device, etc. The communication device 150 communicates unique operator-specific information (e.g., operator identification information, etc.) to the charging station 120 (either directly or indirectly through the server 180). In some embodiments, electric vehicle operator 145 may use the communication device 150 to monitor the charging status of the electric vehicle 110. In one embodiment of the invention, the communication device 150 may be coupled with the electric vehicle 110.

Based on the information communicated by the communication device 150, a determination is made whether the electric vehicle operator 145 is authorized to use the charging station 120 and thus may utilize the charging point connection 155 when energized. In one embodiment, the charging station 120 locally determines whether the operator 145 is authorized (e.g., by checking whether the operator 145 is represented on a list of authorized users stored in the charging station 120). In another embodiment of the invention, the charging station 120 may transmit an authorization request that includes the information read from the communication device 150 to the server 180 (through the data control unit 170) for authorization. In another embodiment of the invention, the server 180 receives the charging session request from the operator 145 directly and determines whether the operator 145 is authorized. In any of these embodiments, if the operator 145 is authorized, the charging station 120 establishes a charging session and energizes the charging point connection 155.

It should be understood that the operator 145 may request a charging session from the charging station 120 differently in some embodiments of the invention. For example, the operator 145 may interact with a payment station coupled with the charging station 120, which may then send appropriate instructions to the charging station 120 regarding the charging of the vehicle 110 (e.g., instructions to energize the charging point connection 155). The payment station may function similarly to a payment station for a parking space. In addition, a payment station coupled with the charging station 120 may be used both for parking payment and charging payment.

According to one embodiment of the invention, a charging session is established after an operator has been authenticated and authorized to initiate a charging session (e.g., may use the charging station 120 at the particular time of the day) and after the charging point connection 155 has been energized.

The server 180 provides services for multiple charging stations. The server 180 stores vehicle operator information (e.g., operator account information, operator contact information (e.g., operator name, street address, email address, telephone number, etc.)) and typically is responsible for accounting (e.g., amount of electricity purchased by individual vehicle operators, etc.). In one embodiment of the invention, the server 180 includes a subscriber portal (available through the Internet) which allows subscribers (owners and operators of electric vehicles) to register for service (which may include providing information regarding their electric vehicles, providing payment information, providing contact information, etc.) and perform other functions (e.g., pay for charging sessions, determine availability of charging stations, check the charging status of their electric vehicle(s), etc.). In addition, the server 180 may include a host portal (available through the Internet) which allows owners or administrators of the charging station 120 (and other charging stations) to configure their charging stations and perform other functions (e.g., determine average usage of charging stations, etc.). Charging stations may also be configured using other means in some embodiments of the invention (e.g., through Telnet, user interface, etc.).

Figure 2A:
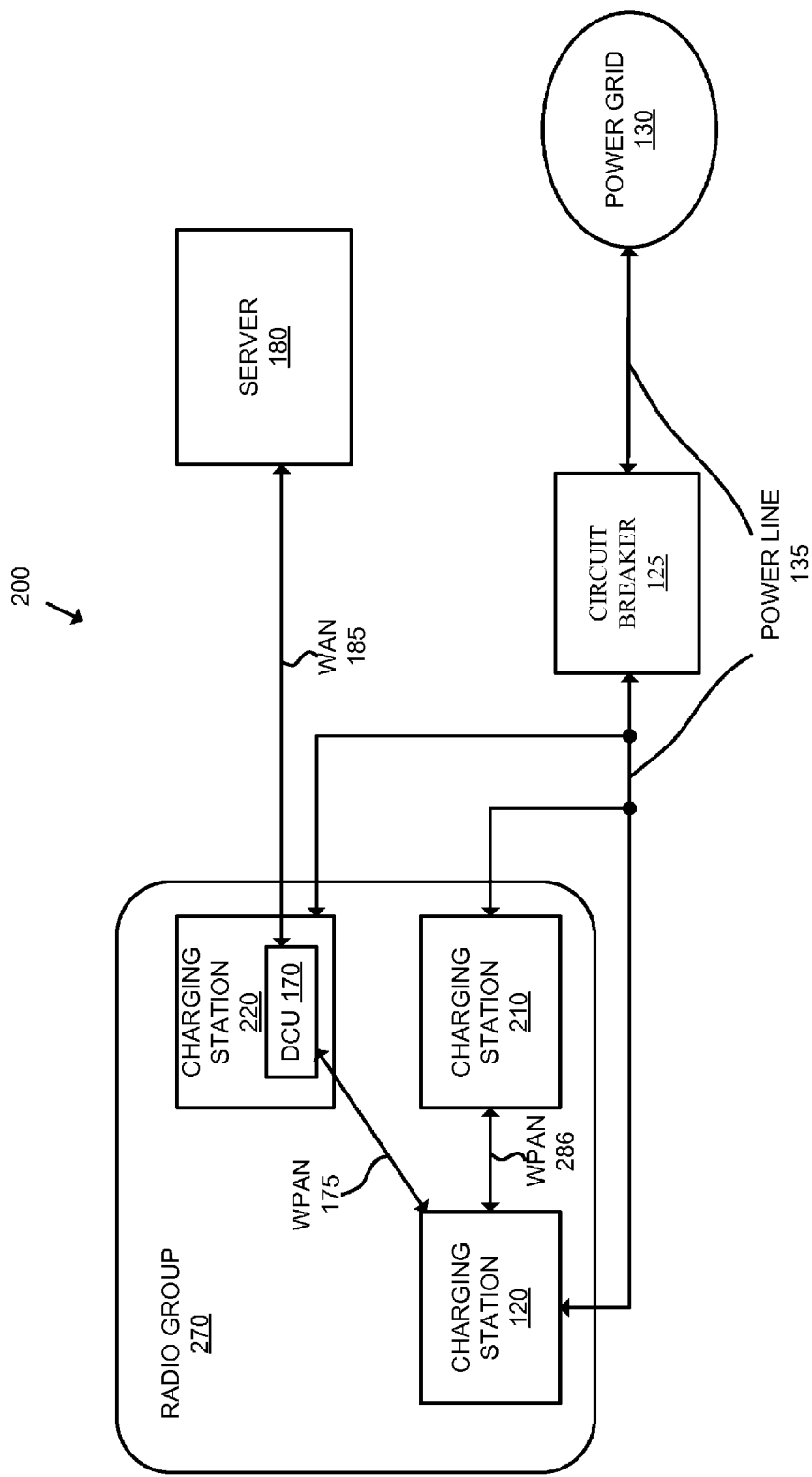
FIG. 2A illustrates an exemplary network of charging stations that are each wired to the same circuit breaker according to one embodiment of the invention.

While FIG. 1 illustrates a single charging station 120, it should be understood that many charging stations may be networked to the server 180 (through one or more data control units) and/or to each other. In addition, multiple charging stations can share the same circuit and be coupled with the same circuit breaker in some embodiments. FIG. 2A illustrates an exemplary network of charging stations according to one embodiment of the invention. The charging station network 200 includes the server 180 and the charging stations 120, 210, and 220. The server 180 is providing services for each of the charging stations 120, 210, and 220. The charging stations 120, 210, and 220 are part of the radio group 270. As used herein, a radio group is a collection of one or more charging stations that collectively has a single connection to a electric vehicle charging station network server. Each radio group includes one or more data control units (DCUs) which connect the charging stations with the server. Typically, DCUs are implemented within a charging station. However, a data control unit may be implemented separately from any charging station (e.g., a standalone device). It should be understood that the network architecture illustrated in FIG. 2A is exemplary, and other architectures may be used in embodiments of the invention (e.g., each charging station may have a direct connection with the server 180).

Each DCU acts as a gateway to the server 180 for those charging stations that are coupled with that DCU. It should be understood that charging stations need not have a direct link to a DCU (e.g., a charging station may be directly linked to another charging station which itself has a direct link to a DCU). For example, DCU 170 (of the radio group 270 and implemented in the charging station 220) is coupled with the server 180 through the WAN link 185 and is coupled with the charging stations 120 and 210. The charging station 120 is directly coupled with the DCU 170 via the WPAN links 175 while the charging station 210 is indirectly coupled with the DCU 170 via the WPAN link 286 to the charging station 120 which is itself directly coupled with the DCU 170 via the WPAN link 175. Thus, the charging stations 120, 210, and 220 transmit messages to the server 180, and receive messages from the server 180, through the DCU 170.

As illustrated in FIG. 2A, each of the charging stations 120, 210, and 220 share the same circuit (they all receive power through the power line 135) and are all each coupled with the same circuit breaker 125. It should be understood that if one of the charging stations 120, 210, and 220 causes the circuit breaker 125 to trip then all of the charging stations will lose their electrical connection with the power grid 130 (i.e., they all lose power). Thus, upon the circuit breaker 125 tripping, any charging sessions currently in progress on the charging stations 120, 210, or 220 will be interrupted.

Figure 2B:
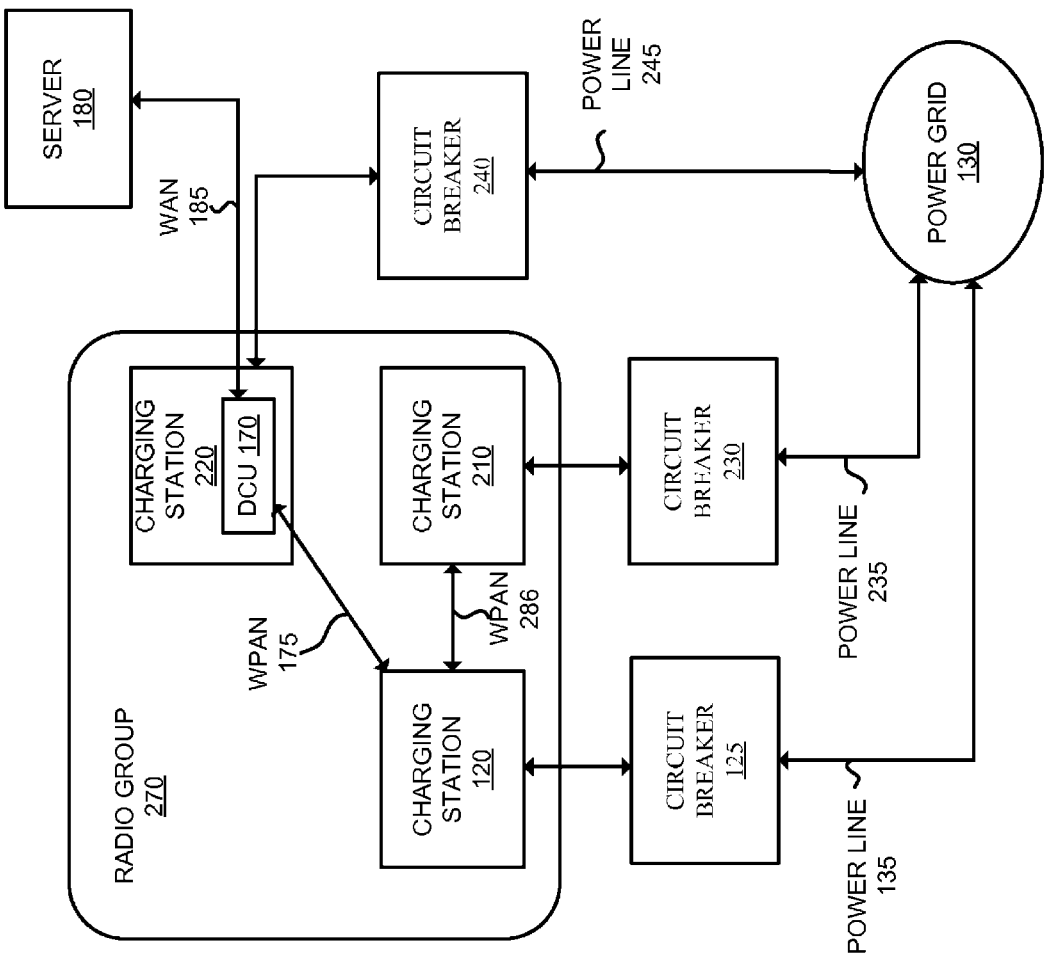
FIG. 2B illustrates an alternative network of charging stations that are each wired to an individual circuit breaker according to one embodiment of the invention.

While FIG. 2A exemplary illustrates multiple charging stations being wired to the same circuit breaker, each charging station in the charging station network can be wired to an individual circuit breaker that is not shared with other charging stations in some embodiments. FIG. 2B illustrates a network of charging stations that are each wired to an individual circuit breaker according to one embodiment of the invention. FIG. 2B is similar to FIG. 2A with the exception that the charging stations 120, 210, and 220 are each wired to a separate circuit breaker (circuit breakers 125, 230, and 240 respectively). As illustrated in FIG. 2B, the charging station 120 is wired to the circuit breaker 125 and connects to the power grid 130 over the power line 135, the charging station 210 is wired to the circuit breaker 230 and connects to the power grid 130 over the power line 235, and the charging station 220 is wired to the circuit breaker 240 and connects to the power grid 130 over the power line 245.

Figure 3:
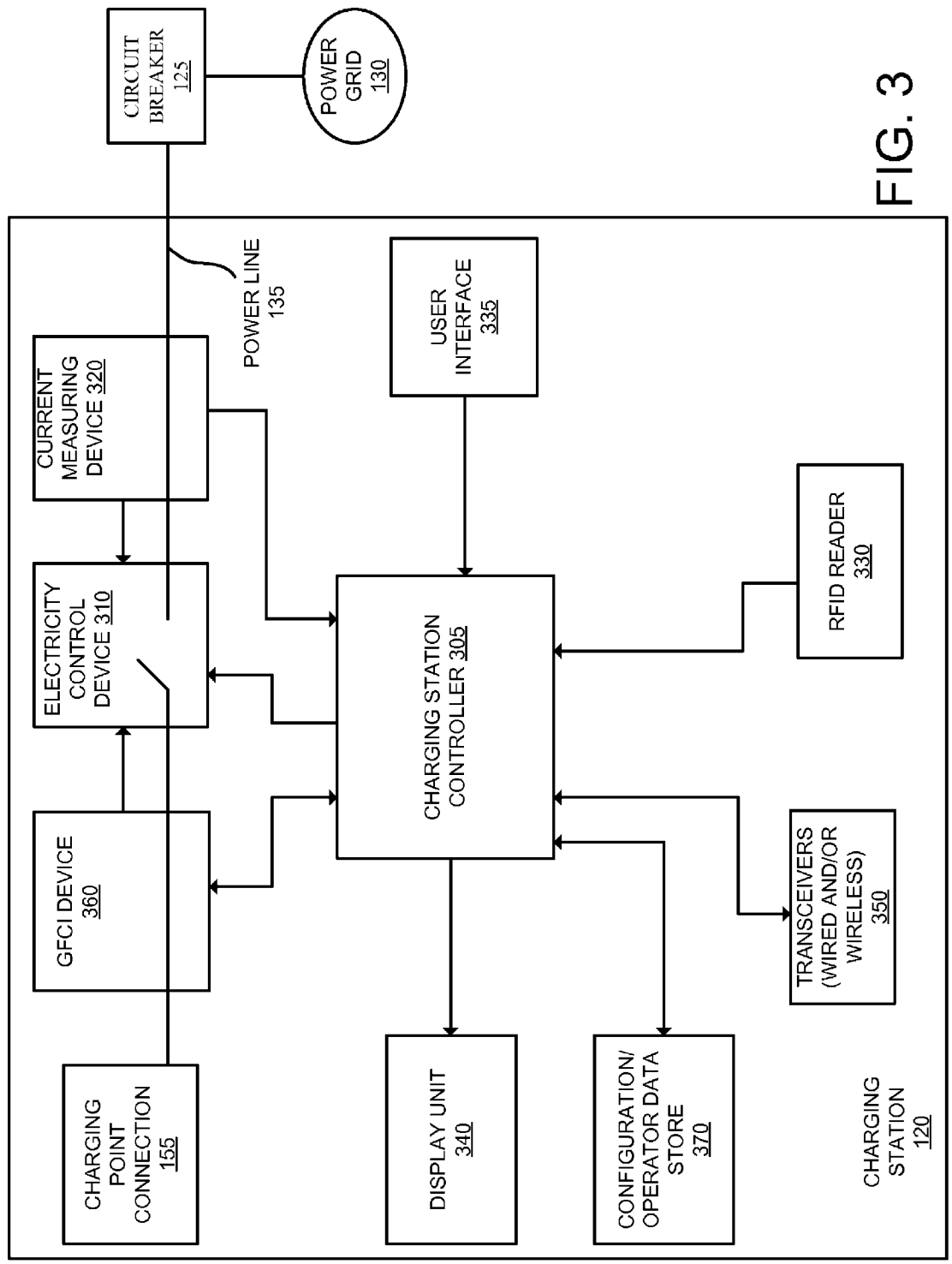
FIG. 3 illustrates an exemplary embodiment of the charging station illustrated in FIG. 1 according to one embodiment of the invention.

FIG. 3 illustrates an exemplary embodiment of the charging station 120 according to one embodiment of the invention. The charging station 120 includes the charging point connection 155, charging station controller 305, the electricity control device 310, the current measuring device 320, the RFID reader 330, the user interface 335, the display unit 340, one or more transceivers 350 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), and the GFCI (ground fault circuit interrupter) device 360. It should be understood that FIG. 3 illustrates an exemplary architecture of a charging station, and other, different architectures may be used in embodiments of the invention described herein. For example, some implementations of charging stations may not include a user interface, an RFID reader, or a connection to a network.

The RFID reader 330 reads RFID tags from RFID enabled devices (e.g., smartcards, key fobs, etc., embedded with RFID tag(s)) of operators that want to use the charging station 120. For example, the operator 145 may wave/swipe the mobile communication device 150 (if an RFID enabled device) near the RFID reader 330 to request a charging session from the charging station 120. As will be described in greater detail later herein, in some embodiments the operator 145 may similarly wave/swipe the communication device 150 near the RFID reader 330 to clear an overcurrent condition or a ground fault condition.

The RFID reader 330 passes the information read to the charging station controller 305. The charging station controller 305 is programmed to include instructions that establish charging sessions with the vehicles. In one embodiment, the operator 145 is authenticated and authorized based on the information the RFID reader 330 receives. While in one embodiment of the invention the charging station 120 locally stores authorization information (e.g., in the configuration/operator data store 370), in other embodiments of the invention the charging station controller 305 transmits an authorization request with a remote device (e.g., the server 180) via one of the transceivers 350. For example, the charging station controller causes an authorization request to be transmitted to the data control unit 170 over a WPAN transceiver (e.g., Bluetooth, ZigBee) or a LAN transceiver. The data control unit 170 relays the authorization request to the server 180.

In some embodiments, in addition to or in lieu of vehicle operators initiating charging sessions with RFID enabled devices, vehicle operators may use the user interface 335 to initiate charging sessions. For example, vehicle operators may enter in account and/or payment information through the user interface 335. For example, the user interface 335 may allow the operator 145 to enter in a username/password (or other information) and/or payment information. In other embodiments of the invention, vehicle operators may request charging sessions through devices remote to the charging station 120 (e.g., payment stations coupled with the charging stations). In addition, in some embodiments the operator 145 may use the user interface 335 to clear an overcurrent condition and/or a ground fault condition.

Sometime after the operator 145 is authorized, the charging station controller 305 causes the charging point connection 155 to be energized. For example, the charging station controller 305 causes the electricity control device 310 to complete the connection of the power line 135 to the power grid 130. In one embodiment, the electricity control device 310 is a solid-state device that is controlled by the charging station controller 305 or any other device suitable for controlling the flow of electricity.

The current measuring device 320 measures the amount of current that is flowing on the power line 135 through the charging point connection 155 (e.g., between the vehicle 110 and the charging station 120). In some embodiments, in addition to electric vehicles being able to be charged from the power grid 130, these electric vehicles can be a source of electric power to be transferred to the power grid 130 (vehicle-to-grid (V2G)). While in one embodiment of the invention the current measuring device 320 measures flow of current, in an alternative embodiment of the invention the current measuring device 320 measures power draw. The current measuring device 320 may include or be coupled with an induction coil or other devices suitable for measuring current. The current measuring device 320 is coupled with the charging station controller 305. The charging station controller 305 is programmed with instructions to monitor the current data output from the current measuring device 320 and to calculate the amount of electricity being used over a given time period. As will be described later herein, the charging station controller 305 is also programmed to determine whether an overcurrent condition exists based on the current data received from the current measuring device 320.

The display unit 340 is used to display messages to the operator 145 (e.g., charging status, confirmation messages, error messages, notification messages, etc.). The display unit 340 may also display parking information if the charging station 120 is also acting as a parking meter (e.g., amount of time remaining in minutes, parking violation, etc.).

The configuration/operator data store 370 stores configuration information which may be set by administrators, owners, or manufacturers of the charging station 120.

In one embodiment, the charging station controller 305 is programmed with instructions to detect overcurrent conditions. Overcurrent conditions occur when the amount of electric current flowing on the power line 135 exceeds an overcurrent threshold (locally for the charging station 120). For example, from the data supplied from the current measuring device 320, the charging station controller 305 determines whether the amount of current flowing exceeds an overcurrent threshold (the overcurrent threshold can be stored in the configuration/operator data store 370 or another suitable memory). It should be understood that overcurrent conditions can exist when transferring electric power from the power grid to the electric vehicles and when transferring electric power from the electric vehicles to the power grid.

In one embodiment, the overcurrent threshold includes a time component. In such embodiments, an overcurrent condition will be triggered if the amount of electric current flowing on the power line 135 exceeds or meets an amount for a continuous amount of time. Thus, a short burst of current flowing on the power line 135 may not trigger an overcurrent condition. Different electric current amounts and time values can be used. For example, as the amount of current flowing on the power line 135 increases, the amount of time the current must flow in order to exceed the overcurrent threshold decreases. For example, a first overcurrent threshold may define an overcurrent condition as 20 amps flowing on the power line for 15 seconds, while another overcurrent threshold may define an overcurrent condition as 30 amps flowing on the power line for 10 seconds. Of course it should be understood that different overcurrent thresholds can be used in embodiments of the invention.

Upon detecting an overcurrent condition, the charging station controller is further programmed with instructions to suspend the charging session and prevent electricity from flowing through the charging point connection 155. For example, the charging station controller 305 causes the electricity control device 310 to de-energize the charging point connection 155. Furthermore, since circuit breakers typically can tolerate an amount of excess load for some amount of time (e.g., a short burst of excess load typically will not cause the circuit breaker to trip), the charging station controller 305 can prevent the circuit breaker 125 from tripping if it detects an overcurrent condition and stops the flow of current prior to the circuit breaker exceeding the tolerance point. Thus, the charging station controller 305 can detect overcurrent conditions and de-energize the charging point connection 155 before the circuit breaker 125 trips.

The charging station controller 305 is further programmed to notify the server 180 of suspended charging sessions due to overcurrent conditions. For example, after detecting an overcurrent condition and de-energizing the charging point connection 155, the charging station controller 305 transmits a charging session status update message to the server 180 (e.g., via the transceivers 350) alerting the server 180 that the charging session has changed from being in an active charging session state to a suspended charging session state due to an overcurrent condition. The charging session status update message can include an identifier of the vehicle operator associated with the charging session that has been suspended (e.g., the vehicle operator that initiated that charging session). In one embodiment, the identifier corresponds with the information transmitted by the mobile communication device 150 (e.g., the identifier transmitted by an RFID enabled device). The charging station controller 305 can also transmit accounting information to the server 180 (e.g., the amount of electricity consumed by the charging session, the amount of time elapsed during the charging session, etc.) after the charging session has been suspended.

After de-energizing the charging point connection 155, the charging station controller 305 may cause a notification message (e.g., text message, email message, etc.) to be sent to the vehicle operator and/or the administrators/owner of the charging station 120 that indicates an overcurrent condition has occurred and the charging session has been suspended. While in one embodiment the charging station controller 305 directly transmits the notification message(s), in other embodiments the server 180 transmits the notification message(s) after receiving a notification that the charging session has been suspended due to an overcurrent condition. The charging station controller 305 can also display via the display unit 340 the overcurrent condition and the suspension of the charging session.

The charging station controller 305 is programmed to receive remote requests to clear the overcurrent condition (e.g., via the RFID reader 330 and/or the transceiver(s) 350). The charging station controller 305 causes an authorization process to be performed on the received requests to clear the overcurrent conditions. For example, in one embodiment the charging station controller 305 locally performs an authorization process on the received requests while in another embodiment the charging station controller 305 generates an authorization request and transmits the authorization request to the server 180 for the authorization process to be performed. If the request is authorized, the charging station controller 305 is further programmed with instructions to clear the overcurrent condition and resume the charging session. The request may be received from the operator of the vehicle that initiated the charging session (e.g., the electric vehicle operator 145) and/or from an administrator or owner of the charging station 120.

In one embodiment, the electric vehicle operator 145 may use the communication device 150 to transmit the clear overcurrent condition request (e.g., present the same RFID tag to the RFID reader 330 of the charging station 120). In one embodiment the charging station 120 locally authenticates and authorizes the request (e.g., the charging station maintains an identifier associated with the suspended charging session), while in other embodiments the charging station 120 transmits the request to the server 180 for authorization. The electric vehicle operator 145 may also use a web portal (e.g., implemented with the server 180) to transmit the clear overcurrent condition request and/or transmit a text message to request the overcurrent condition to be cleared. Other potential users of the charging station 120 will not be authorized to clear the overcurrent condition. For example in some embodiments, only the RFID tag that was used to initiate the charging session and administrator RFID tags (with administrator privileges) are authorized to clear the overcurrent condition.

In some embodiments the overcurrent conditions can also be cleared by administrators or owners of the charging station 120. For example, an administrator may present an administrator RFID enabled device (e.g., an RFID tag with administrator privileges) to the RFID reader 330 to request that the overcurrent condition be cleared. In addition, administrators or owners can send a text message to the charging station 120 to request that the overcurrent condition be cleared and/or use a host portal to clear the overcurrent condition request.

Sometime after the charging station controller 305 authorizes the request to clear the overcurrent condition, the charging station controller 305 causes the electricity control device 310 to energize the charging point connection 155. The charging session can then be resumed. Thus, it should be understood that unlike typical prior art implementations which require a manual reset of a tripped circuit breaker upon an overcurrent condition, embodiments of the invention allow for a remote reset of an overcurrent condition without a manual reset of a tripped circuit breaker. Thus this prevents the need for a maintenance call to manually reset the circuit breaker which saves time and saves money since the charging station cannot be used while the circuit breaker is tripped.

Furthermore, since the charging station 120 locally handles overcurrent conditions which can prevent the circuit breaker 125 from tipping, any charging stations that are also wired to the circuit breaker 125 will typically not be affected by the overcurrent condition of the charging station 120. For example, with reference to FIG. 2, if the charging station 120 locally handles an overcurrent condition and prevents the circuit breaker 125 from tripping, the charging stations 210 and 220 which are also coupled with the circuit breaker 125 will not be affected.

In one embodiment, the charging station controller 305 is programmed with instructions to automatically clear overcurrent conditions and cause the charging point connection 155 to be energized after a certain amount of time (an automatic overcurrent condition retry) without receiving a request. For example, after waiting for an amount of time (e.g., 15 minutes), the charging station controller 305 causes the electricity control device 310 to energize the charging point connection 155. In one embodiment, the automatic overcurrent condition retry can be performed for a number of times over a given amount of time or during a single charging session (e.g., 4 times in a charging session). However, if the overcurrent condition reappears over that number of times, the charging station will cease to automatically clear the overcurrent condition.

Sometime after the overcurrent condition is cleared, the charging station 120 is further programmed to notify the server 180 that the overcurrent condition is cleared (e.g., by transmitting a charging session status update message to the server 180 indicating that the charging session has transitioned from a suspended charging state to an active charging state). In some embodiments, sometime after the overcurrent condition is cleared, the charging station controller 305 may cause a notification message (e.g., text message, email message, etc.) to be set to the vehicle operator and/or administrator(s) and/or owner(s) of the charging station 120 that indicates that the overcurrent condition has been cleared and the charging session has been resumed.

In some embodiments, the current measuring device 320 can determine whether an overcurrent condition exists and can directly cause the electricity control device 310 to de-energize the charging point connection 155. In such embodiments, the current measuring device 320 can also notify the charging station controller 305 that the charging point connection 155 has been de-energized so the charging station controller 305 can notify the server 180 and cause notification messages to be transmitted as described above.

The GFCI device 360, which is coupled with the charging point connection 155, the electricity control device 310, and the charging station controller 305, measures the amount of electric current flowing on the hot wire coupled with the charging point connection 155 and the neutral wire coupled with the charging point connection 155 and can detect ground fault conditions. During regular operation, the amount of current flowing on the hot wire and the neutral wire should be substantially equivalent. If there is a difference, the GFCI device 360 is configured to de-energize the charging point connection 155. The GFCI device 360 can detect small differences in current (e.g., 5 milliamps) and can react (e.g., de-energize the charging point connection 155) quickly (e.g., twenty milliseconds).

Sometime after the GFCI device 360 detects a ground fault condition (some amount of difference between the amount of electric current flowing on the hot wire and the neutral wire), the GFCI device 360 may also alert the charging station controller 305 of the ground fault condition. The charging station controller 305 can then suspend the charging session. The charging station controller 305 is further programmed to notify the server 180 of suspended charging sessions due to ground fault conditions in a similar way as overcurrent conditions. For example, the charging station controller 305 transmits a charging session status update message to the server 180 (e.g., via the transceivers 350) alerting the server 180 that the charging session has changed from being in an active charging session state to a suspended charging session state due to a ground fault condition. The charging session status update message can include an identifier of the vehicle operator associated with the charging session that has been suspended (e.g., the vehicle operator that initiated that charging session). In one embodiment, the identifier corresponds with the information transmitted by the mobile communication device 150 (e.g., the identifier transmitted by an RFID enabled device). The charging station controller 305 can also transmit accounting information to the server 180 (e.g., the amount of electricity consumed by the charging session, the amount of time elapsed during the charging session, etc.) after the charging session has been suspended.

After a ground fault condition has been detected, the charging station controller 305 may cause a notification message (e.g., text message, email message, etc.) to be sent to the vehicle operator and/or the administrators/owner of the charging station 120 that indicates a ground fault condition has occurred and the charging session has been suspended. While in one embodiment the charging station controller 305 directly transmits the notification message(s), in other embodiments the server 180 transmits the notification message(s) after receiving a notification that the charging session has been suspended due to a ground fault condition. The charging station controller 305 can also display a notice of the ground fault condition and the suspension of the charging session on the display unit 340.

The charging station controller 305 is also programmed to clear the ground fault condition upon receipt of an authorized request. Similar to the request to clear an overcurrent condition, the charging station controller 305 can receive authorized requests to clear a ground fault conditions from the vehicle operator that initiated the charging session (e.g., the vehicle operator 145) and/or from an administrator or owner of the charging station 120. For example, the electric vehicle operator 145 can use the communication device 150 to transmit the clear ground fault condition request (e.g., by presenting the same RFID tag to the charging station 120 as was used to initiate the charging session). In one embodiment the charging station controller 305 locally authenticates and authorizes the request (e.g., the charging station maintains an identifier associated with the suspended charging session), while in other embodiments the charging station controller 305 generates and transmits an authorization request to the server 180 for authorization. The electric vehicle operator 145 may also transmit the clear ground fault condition request via a web portal and/or transmit the request by text message or email. Other potential users of the charging station 120 will not be authorized to clear the ground fault condition. For example in some embodiments, only the RFID tag that was used to initiate the charging session and administrator RFID tags (with administrator privileges) are authorized to clear the ground fault condition.

Administrators and/or owners of the charging station 120 can also submit a clear ground fault condition request to clear the ground fault condition. For example, an administrator can present an administrator RFID enabled device (e.g., an RFID tag with administrator privileges) to the RFID reader 330 to request that the ground fault condition be cleared. The administrator(s) and/or owner(s) of the charging station 120 may also submit the request through a host portal (implemented within the server 180) which communicates the request to the charging station 120, and/or transmit the request via text message or email.

Sometime after the charging station controller 305 receives the request to clear the ground fault condition and authorizes that request, the charging station controller 305 causes the electricity control device 310 to energize the charging point connection 155. After the charging point connection 155 is energized, the charging session can be resumed. Of course it should be understood that in some circumstances, the charging session will be terminated instead of being resumed (e.g., if the vehicle operator has removed the charging cord from the charging station 120). It should also be understood that unlike typical prior art implementations which require a manual reset of a GFCI device, embodiments of the invention allow for a remote clearing of a GFCI condition which prevents the need for a manual reset.

In one embodiment, the ground fault condition is automatically cleared and the charging point connection 155 is energized after a certain amount of time (an automatic ground fault condition retry). In one embodiment the charging station controller 305 is programmed to perform the automatic ground fault condition retry while in other embodiments the GFCI device 360 performs the automatic ground fault condition retry. For example, after waiting for an amount of time (e.g., 15 minutes), the electricity control device 310 energizes the charging point connection 155. In one embodiment, the automatic ground fault condition retry can be performed for a number of times over a given amount of time or during a single charging session (e.g., 4 times in a charging session). However, if the ground fault condition reappears over that number of times, the charging station will assume that the underlying situation causing the ground fault condition has not changed and the charging station ceases to automatically clear the ground fault condition.

Sometime after the ground fault condition is cleared, the charging station 120 is further programmed to notify the server 180 that the ground fault condition is cleared (e.g., by transmitting a charging session status update message to the server 180 indicating that the charging session has transitioned from a suspended charging state to an active charging state).

In some embodiments, sometime after the ground fault condition is cleared, the charging station controller 305 may cause a notification message (e.g., text message, email message, etc.) to be sent to the vehicle operator and/or administrator(s) and/or owner(s) of the charging station 120 that indicates that the ground fault condition has been cleared and the charging session has been resumed.

Figure 4:
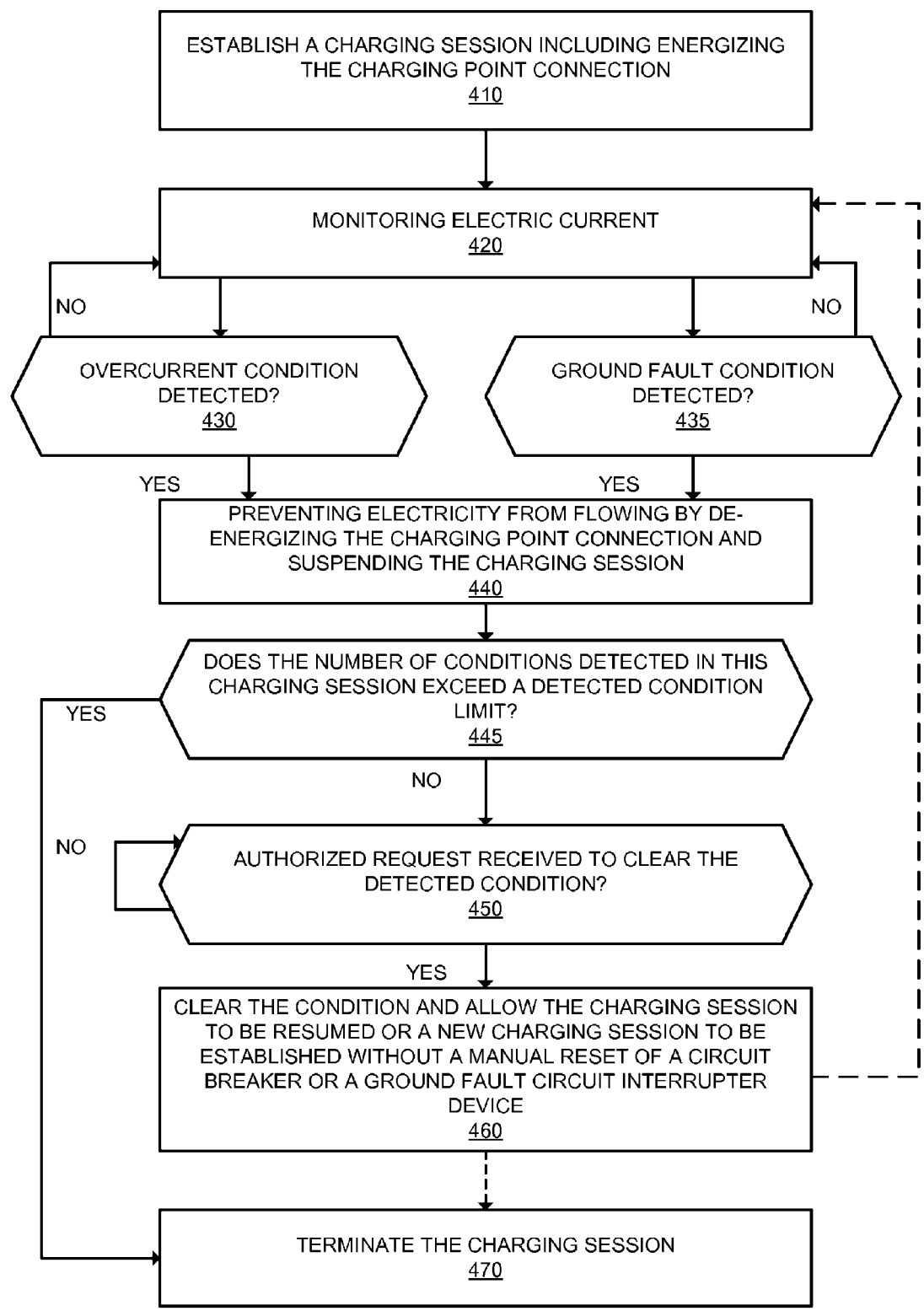
FIG. 4 is a flow diagram illustrating exemplary operations for remotely clearing overcurrent conditions and/or ground fault conditions in a networked charging station for electric vehicles according to one embodiment of the invention.

FIG. 4 is a flow diagram illustrating exemplary operations for remotely clearing overcurrent conditions or ground fault conditions in a networked charging station for electric vehicles. The operations of FIG. 4 will be described with reference to the exemplary embodiment of FIG. 3. However, it should be understood that the operations of FIG. 4 can be performed by embodiments of the invention other than those discussed with reference to FIG. 3, and the embodiments discussed with reference to FIG. 3 can perform operations different than those discussed with reference to FIG. 4. In one embodiment, the operations described with reference to FIG. 4 are performed by the charging station controller 305.

At block 410, the charging station controller 305 establishes a charging session including energizing the charging point connection 155. With reference to FIG. 1, a charging session has been established between the electric vehicle 110 and the charging station 120. Flow moves from block 410 to block 420.

At block 420 the charging station 120 monitors electric current. For example, the current measuring device 320 measures electric current on the power line 135 and provides current data to the charging station controller 305. Based on that current data, the charging station controller 305 can determine whether an overcurrent condition exists. The GFCI device 360 measures electric current on the hot wire and neutral wire coupled with the charging connection point 155 to determine whether a ground fault condition exists. Flow moves from block 420 to blocks 430 and 435.

At block 430, the charging station controller 305 detects whether an overcurrent condition exists. For example, an overcurrent condition exists when the current flowing through the charging point connection 155 on the power line 135 exceeds an overcurrent threshold. In one embodiment, the charging station controller 305 compares the current data received from the current measuring device 320 against one or more overcurrent thresholds. As described previously, the charging station controller 305 can compare the current data to different overcurrent thresholds and the overcurrent thresholds may include a time component. If the current exceeds or meets an overcurrent threshold, an overcurrent condition is detected and flow moves to block 440. If an overcurrent threshold is not exceeded, then an overcurrent condition is not detected and flow moves back to block 420.

At block 435, the GFCI device 360 detects whether a ground fault condition exists. For example, a ground fault condition exists when there is a difference between the amount of current flowing on the hot wire and the neutral wire that are coupled with the charging point connection 155. If the GFCI device 360 detects a ground fault condition, then flow moves to block 440 otherwise flow moves back to block 420.

At block 440, electricity is prevented from flowing on the power line 135 by de-energizing the charging point connection 155. For example, if an overcurrent condition is detected, the charging station controller 305 causes the electricity control device 310 to break the electrical connection between the charging point connection 155 and the power line 135. If a GFCI condition is detected, the GFCI device 360 causes the electricity control device 310 to break the electrical connection between the charging point connection 155 and the power line 135. The charging station controller 305 also suspends the charging session. The charging station controller 305 also increments a detected condition value. The charging station controller 305 may also cause a notification message (e.g., email, text message, etc.) to be transmitted to the vehicle operator 145 and/or administrators or owners of the charging station 120 indicating that the charging session has been suspended due to a ground fault condition or an overcurrent condition. In addition, the charging station 305 causes a charging session status update message to be sent to the server 180 that indicates that the charging session has been suspended due to a ground fault condition or an overcurrent condition. Flow moves from block 440 to block 445.

At block 445, the charging station controller 305 determines whether the number of conditions that have been detected during the charging session exceeds a detected condition limit. In some embodiments, the charging station 120 only allows conditions (overcurrent conditions and/or ground fault conditions) to be cleared remotely (and/or automatically) a certain number of times before it will terminate the charging session. Thus, if the number of conditions that has been detected exceeds a detected condition limit, then flow moves to block 470 where the charging session is terminated, otherwise flow moves to block 450. After a charging session is terminated, that charging session cannot be resumed (thus the vehicle operator cannot clear the detected condition and resume the charging session with a remote request).

At block 450, the charging station controller 305 determines whether an authorized request has been received to clear the detected condition. If an authorized request has been received, then flow moves to block 460, otherwise flow moves back to block 450 where the charging station controller 305 continues to wait for a request to clear the detected condition. As previously described, the request to clear the detected condition can be received from the operator that initiated the session and/or administrators and/or owners of the charging station 120.

At block 460, the charging station controller 305 clears the detected condition allowing the charging session to be resumed or a new charging session to be established without a manual reset of a circuit breaker (e.g., without a manual reset of the circuit breaker 125) or a GFCI device. For example, the charging station controller 305 causes the electricity control device 310 to energize the charging point connection 155 to allow current to flow on the power line 135 between the vehicle 110 and the power grid 130. If the charging session is to be resumed, then flow moves back to block 420 where the electric current is monitored. If the charging session is to be terminated, then flow moves to block 470.

Figure 5:
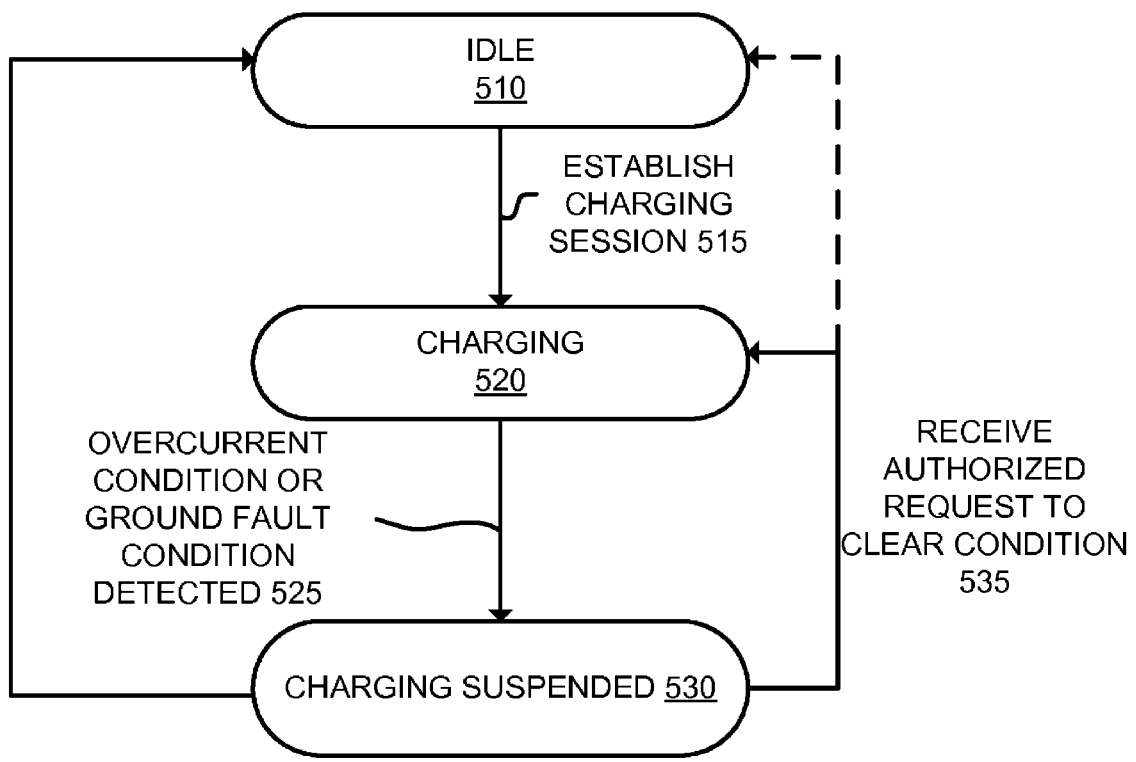
FIG. 5 illustrates an exemplary state diagram for a networked charging station for electric vehicles that allows for a remote clearing of overcurrent conditions and/or ground fault conditions according to one embodiment of the invention.

FIG. 5 illustrates an exemplary state diagram for a networked charging station for electric vehicles that allows for a remote clearing of overcurrent conditions and/or ground fault conditions according to one embodiment of the invention. FIG. 5 will be described with reference to the exemplary embodiment of FIG. 3.

The charging station 120 begins in the idle state 510. In the idle state 510, the charging station 120 is not currently charging an electric vehicle. The charging station 120 transitions from the idle state 510 to the charging state 520 after establishing a charging session 515. As previously described herein, establishing the charging session 515 includes energizing a charging point connection (e.g., the charging point connection 155) of the charging station 120. The current between the electric vehicle 110 and the charging station 120 is monitored in the charging state 520.

The charging station 120 transitions from the charging state 520 to the charging suspended state 530 after detecting an overcurrent condition or a ground fault condition 525. In the charging suspended state 530, the charging point connection 155 is de-energized thereby preventing current from flowing between the electric vehicle 110 and the charging station 120. In one embodiment, the charging station 120 transitions from the charging suspended state 530 back to the charging state 520 after receiving an authorized request to clear the condition 535 that caused the charging session to be suspended. As previously described herein, the authorized request may be received from the vehicle operator 110 and/or from the administrators of the charging station 120 and/or from the owners of the charging station 120. In one embodiment, the charging station 120 transitions from the charging suspended state 530 back to the idle state 510 after receiving a request to clear the condition 535. For example, the vehicle operator 110 can clear the condition by waving/swiping the mobile communication device 150 near the charging station 120 and can determine to end the session rather than continue charging the vehicle 110 (e.g., in order to remove the cord from the charging station 120).

Thus, the networked charging station described herein protects against overcurrent conditions and/or ground fault conditions while allowing those conditions to be reset remotely thereby eliminating the need for them in the reset of a circuit breaker or a ground fault circuit interrupt device. This reduces the cost of clearing the conditions and allows the charging sessions to be resumed more quickly and more efficiently than prior limitations. For example, in typical implementations, a charging station is coupled with a circuit breaker located in a panel that is inaccessible to vehicle operators and must be reset by maintenance personnel (e.g., administrators of the charging station) when tripped. It should be understood that a charging station cannot be used while its circuit is currently tripped. Thus, there can be significant downtime of the charging station and the potential loss of revenue if a manual reset of the circuit breaker is required. A similar downtime may be experienced if a manual reset of a GFCI device is required. In contrast, with embodiments of the invention, overcurrent conditions and/or ground fault conditions can be reset remotely by the operator of the electric vehicle associated with the charging session and/or administrators and/or owners of the network charging station thereby preventing the need for a maintenance call for a manual reset of a circuit breaker or a GFCI device.

Furthermore, since circuit breakers typically can tolerate an amount of excess load for some amount of time (e.g., a short burst of excess load typically will not cause the circuit breaker to trip), the networked charging station described herein can prevent the circuit breaker from tripping since it can detect an overcurrent condition and stop the flow of current.

Furthermore, the overcurrent protection in the networked charging station described herein protects the circuitry in the networked charging station from overheating and potentially causing a fire.

Figure 6:
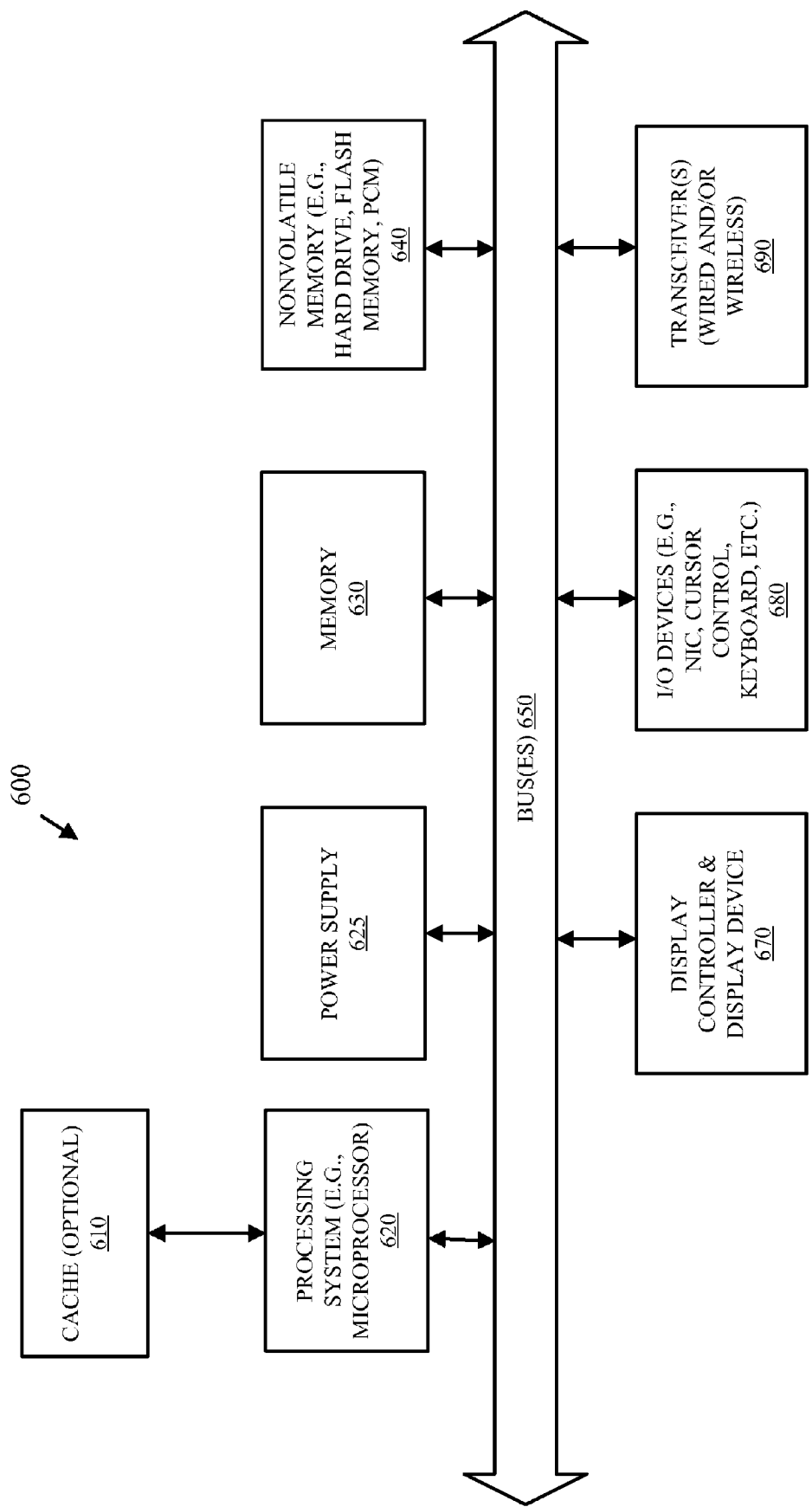
FIG. 6 is a block diagram illustrating an exemplary architecture of a computing device that may be used in some embodiments of the invention.

FIG. 6 is a block diagram illustrating an exemplary architecture of a charging station that may be used in some embodiments of the invention. It should be understood that while FIG. 6 illustrates various components of a charging station, it is not intended to represent any particular architecture or manner of interconnecting the components as such details are not germane to the present invention. It will be appreciated that other charging stations that have fewer components or more components may also be used with the present invention. In one embodiment, the architecture illustrated in the charging station 600 is representative of the architecture of the charging station 120.

As illustrated in FIG. 6, the charging station 600, which is a form of a computing device, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 can include one or more processors and can retrieve instruction(s) from the memory 630 and/or the nonvolatile memory 640, and execute the instructions to perform operations as described above. The bus 650 interconnects the above components together and also interconnects those components to the display controller & display device 670, Input/Output device(s) 680 (e.g., NIC (Network Interface Card), a cursor control (e.g., mouse, touchscreen, touchpad, etc.), a keyboard, etc.), and the transceiver(s) 690 (wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, RFID, etc.)).

While the GFCI device 360 and the current measuring device 320 have illustrated and described as separate devices, in some embodiments the functionality described herein of the GFCI device 360 and the current measuring device 320 can be performed by a single device. Thus, this single device can detect GFCI conditions and overcurrent conditions.

While embodiments have been described with reference to the GFCI device 360 causing the electricity control device 310 to de-energize the charging point connection 155 by breaking the electrical connection of the power line 135, in some embodiments the GFCI device 360 does not instruct the electricity control device 310 to break the electrical connection but rather includes a switch itself to de-energize the charging point connection 155.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for protecting against overcurrent conditions in a networked charging station for electric vehicles performed on the networked charging station for electric vehicles, the method comprising:
    receiving a request from an operator of an electric vehicle to establish a charging session for the electric vehicle;
    establishing the charging session for the operator including energizing a charging point connection of the networked charging station to allow current to flow through a charging cord towards the electric vehicle;
    responsive to detecting an overcurrent condition, performing the following:
        preventing current from flowing through the charging cord by de-energizing the charging point connection, and
        suspending the charging session;
    receiving a remote request to clear the detected overcurrent condition; and
    responsive to receiving the remote request to clear the detected overcurrent condition, performing the following:
        clearing the overcurrent condition without a manual reset of a circuit breaker coupled with the networked charging station for electric vehicles,
        energizing the charging point connection, and
        resuming the charging session.

2. The method of claim 1, further comprising protecting against ground fault conditions, including the following:
    responsive to detecting a ground fault condition, performing the following:
        preventing current from flowing through the charging cord by de-energizing the charging point connection, and
        suspending the charging session;
    receiving a remote request to clear the detected ground fault condition; and
    responsive to receiving the remote request to clear the ground fault condition, performing the following:
        clearing the ground fault condition without a manual reset of a ground fault circuit interrupter device,
        energizing the charging point connection, and
        resuming the charging session.

3. The method of claim 1, wherein the request to establish the charging session is received from a mobile wireless communication device of the operator, and wherein the remote request to clear the detected overcurrent condition is received from the operator of the electric vehicle via the mobile wireless communication device or a subscriber web portal, or received from an administrator of the networked charging station via a different mobile wireless communication device or a host portal.

4. The method of claim 2, wherein the request to establish the charging session is received from a mobile wireless communication device of the operator, and wherein the remote request to clear the detected ground fault condition is received from the operator of the electric vehicle via the mobile wireless communication device or a subscriber web portal, or received from an administrator of the networked charging station via a different mobile wireless communication device or a host portal.

5. The method of claim 2, wherein the charging point connection is a power receptacle.

6. The method of claim 2, wherein the charging point connection is an attached charging cord.

7. The method of claim 1, wherein responsive to detecting the overcurrent condition, further notifying an administrator of the networked charging station that the charging session has been suspended due to the overcurrent condition, and wherein responsive to detecting the ground fault condition, further notifying the administrator of the networked charging station that the charging session has been suspended due to the ground fault condition.

8. The method of claim 1, wherein responsive to detecting the overcurrent condition, further notifying the operator that the charging session has been suspended, and wherein responsive to detecting the ground fault condition, further notifying the operator that the charging session has been suspended.

9. The method of claim 8, wherein the notifying includes transmitting an email message or a text message to the operator.

10. A networked charging station for electric vehicles, comprising:
    a charging point connection to couple electric vehicles to a power line coupled with a power grid;
    an electricity control device coupled with the charging point connection to control the flow of electricity to the charging point connection;
    a current measuring device coupled with the charging point connection to measure electric current flowing on the power line through the charging point connection;
    a charging station controller coupled with the electricity control device and the current measuring device, the charging station controller to receive current data from the current measuring device and to perform the following:
        detect overcurrent conditions based on the current data received from the current measuring device, and responsive to detecting an overcurrent condition, cause the electricity control device to de-energize the charging point connection,
        receive requests to clear the overcurrent conditions,
        cause an authorization to be performed on the received requests, and
        responsive to receipt of an authorized request to clear an overcurrent condition, cause the electricity control device to energize the charging point connection without a manual reset of a circuit breaker coupled with the networked charging station for electric vehicles.

11. The networked charging station for electric vehicles of claim 10, further comprising:
    a GFCI (Ground Fault Circuit Interrupter) device coupled with the electricty control device and the charging station controller, the GFCI device to detect ground fault conditions and cause the electricity control device to de-energize the charging point connection.

12. The networked charging station for electric vehicles of claim 11, wherein the charging station controller is further configured to perform the following:
    receive requests to clear the ground fault conditions,
    cause an authorization to be performed on the received requests, and
    responsive to receipt of an authorized request to clear a ground fault condition, cause the electricity control device to energize the charging point connection without a manual reset of the GFCI device.

13. The networked charging station for electric vehicles of claim 12, wherein the charging point connection is a power receptacle.

14. The networked charging station for electric vehicles of claim 12, wherein the charging point connection is an attached charging cord.

15. The networked charging station for electric vehicles of claim 12, further comprising:
- a RFID (Radio-frequency identification) reader to read RFID tags from mobile communication devices and pass that information to the charging station controller; and
- wherein the requests to clear the overcurrent conditions are received through the RFID reader and provided to the charging station controller.

16. The networked charging station for electric vehicles of claim 15, further comprising:
- a set of one or more transceivers to communicate with an electric vehicle charging station network server, wherein the communication includes the following:
  - transmission of information received from the RFID reader to the electric vehicle charging station network server for authorization, and
  - transmission of charging session status update messages that indicate a change in charging session status from active to suspended, and from suspended to active.

17. A non-transitory machine-readable storage medium that provides instructions that, if executed by a processor on a networked charging station for electric vehicles, will cause said processor to perform operations for protecting against overcurrent conditions, said operations comprising:
- receiving a request from an operator of an electric vehicle to establish a charging session for the electric vehicle;
- establishing the charging session for the operator including energizing a charging point connection of the networked charging station to allow current to flow through a charging cord towards the electric vehicle;
- responsive to detecting an overcurrent condition, performing the following:
  - preventing current from flowing through the charging cord by de-energizing the charging point connection, and
  - suspending the charging session;
- receiving a remote request to clear the detected overcurrent condition; and
- responsive to receiving the remote request to clear the detected overcurrent condition, performing the following:
  - clearing the overcurrent condition without a manual reset of a circuit breaker coupled with the networked charging station for electric vehicles,
  - energizing the charging point connection, and
  - resuming the charging session.

18. The non-transitory machine-readable storage medium of claim 17, further comprising protecting against ground fault conditions, including the following:
- receiving a remote request to clear a ground fault condition; and
- responsive to receiving the remote request to clear the ground fault condition, performing the following:
  - clearing the ground fault condition without a manual reset of a ground fault circuit interrupter device,
  - energizing the charging point connection, and
  - resuming the charging session.

19. The non-transitory machine-readable storage medium of claim 17, wherein the request to establish the charging session is received from a mobile wireless communication device of the operator, and wherein the remote request to clear the detected overcurrent condition is received from the operator of the electric vehicle via the mobile wireless communication device or a subscriber web portal, or received from an administrator of the networked charging station via a different mobile wireless communication device or a host portal.

20. The non-transitory machine-readable storage medium of claim 18, wherein the request to establish the charging session is received from a mobile wireless communication device of the operator, and wherein the remote request to clear the detected ground fault condition is received from the operator of the electric vehicle via the mobile wireless communication device or a subscriber web portal, or received from an administrator of the networked charging station via a different mobile wireless communication device or a host portal.

* * * * *